United States Patent [19]

Doering et al.

[11] 3,767,859

[45] Oct. 23, 1973

[54] HOSPITAL COMMUNICATION SYSTEM

[75] Inventors: William E. Doering, Manchester, Mo.; Willis J. Jensen, Palatine, Ill.

[73] Assignee: Clemetron Corporation, Chicago, Ill.

[22] Filed: Dec. 30, 1971

[21] Appl. No.: 214,052

[52] U.S. Cl. ........ 179/1 H, 179/1 MN, 179/15 BM, 179/37

[51] Int. Cl. .......................................... H04m 3/22

[58] Field of Search .................... 179/1 H, 2 A, 1 B, 179/1 MN, 15 AL, 15 BA, 15 BL, 15 BM, 37; 178/5.6

[56] References Cited

UNITED STATES PATENTS

| | | | |
|---|---|---|---|
| 3,534,161 | 10/1970 | Friesen et al. | 178/5.6 |
| 3,584,151 | 6/1971 | Kielar | 179/1 H |
| 3,632,863 | 1/1972 | Hirashima | 178/5.6 |
| 3,668,307 | 6/1972 | Face et al. | 178/5.6 |
| 3,210,747 | 10/1965 | Clynes | 179/15 BL |
| 3,261,922 | 7/1966 | Edson et al. | 179/15 BM |
| 3,226,644 | 12/1965 | Goode et al. | 179/15 BM X |
| 3,573,379 | 4/1971 | Schmitz et al. | 179/2.5 R X |

*Primary Examiner*—Thomas W. Brown
*Attorney*—Richard D. Mason et al.

[57] ABSTRACT

A hospital communication system uses a single coaxial cable to transmit audio and physiological data between patient rooms and a control area, such as a nursing station. The nurse-call facilities use a dual frequency channel over the cable to transmit room selection addresses between the rooms and the station to control audio transmission and enabling room call displays. Data monitored in the rooms is transmitted in digital form to displays at the station using the common cable and a distinct frequency for each room. Each monitored item in a room is individually addressed to control display selection. Selection, address, and physiological data is transmitted using pulse code modulation techniques.

4 Claims, 3 Drawing Figures

10

INVENTORS
WILLIAM E. DOERING AND
BY WILLIS J. JENSEN
Mason, Kolehmainen, Rathburn & Wyss
ATTORNEYS

HOSPITAL COMMUNICATION SYSTEM

This invention relates to a hospital communication system and, more particularly, to a new and improved system for transmitting audio, supervisory, and physiological data between patient rooms and a nursing station using a single high frequency communication link or cable.

Systems have been proposed which use various portions of entertainment television receivers in different operational modes as parts of systems for communicating audio and physiological data between patient rooms and a control or central area such as a nursing station. These patient and nursing stations are linked and the data transmitted using a common coaxial cable with distinct frequency assignments for various control and data functions. Examples of this type of system are shown in U.S. Pat. Nos. 3,423,521 and 3,534,161. Another system shown in U.S. Pat. No. 3,572,316 uses existing hospital wiring ranging from bell wiring to television program distribution cables for transmitting frequency modulated physiological data from remote areas, such as patient rooms, to a central area such as a nursing station.

These types of systems primarily rely on frequency separation for the identification and control of the various audio and physiological signal sources. Thus, they are subject to excessive band width requirements, require large numbers of frequency sensitive components, and may be subject to excessive cross-talk. These difficulties may be aggravated where television signals are superimposed on the common link. These systems also frequently do not possess sufficient flexibility in changing and controlling the flow of physiological data between the patients' rooms and one or more control areas. Further, the system often arose from the superimposition of additional functions on an existing system, and the resulting arrangement lacked a coherent system design, particularly with respect to the ability to add capacity using standardized components or modules.

Accordingly, one object of the present invention is to provide a new and improved hospital communication system using a common channel for supplying a nurse call system and the remote monitoring of physiological data.

Another object is to provide a hospital communication system using a common communication channel in a nurse-call arrangement affording selection, display, and audio communication.

A further object is to provide a novel system for monitoring, transmitting, and displaying physiological data using a common channel communication system.

In accordance with these and any other objects, an embodiment of the invention comprises a hospital communication system in which a single common communication link such as a coaxial cable extending over, for example, one floor or wing of a hospital provides not only a multistation nurse-call system but also a means for transmitting remotely monitored physiological data from patient rooms to a central area, such as the nursing station. The nurse-call system affords great flexibility in the establishment of bidirectional audio communication links between the nursing station and the patient rooms as well as affording room identifying displays at the nurse station. In general, this is accomplished using station and display addressing modulated on carrier frequencies also used for the transmission of audio intelligence.

Physiological data remotely monitored in the patients' rooms is continuously displayed in the nursing station using frequency assignments separate from those of the nurse-call system. The physiological data provided by the monitors in the remote area is digitized and supplied with an address individually identifying the associated data or display unit in the remote area. The digitized address and physiological data is transmitted in sequence over a common communication link to the central office at which it is decoded and selectively displayed in the various display units under the control of the transmitted address information.

Many other objects and advantages of the present invention will become apparent from considering the following detailed description in conjunction with the drawings in which.

Figure 1:
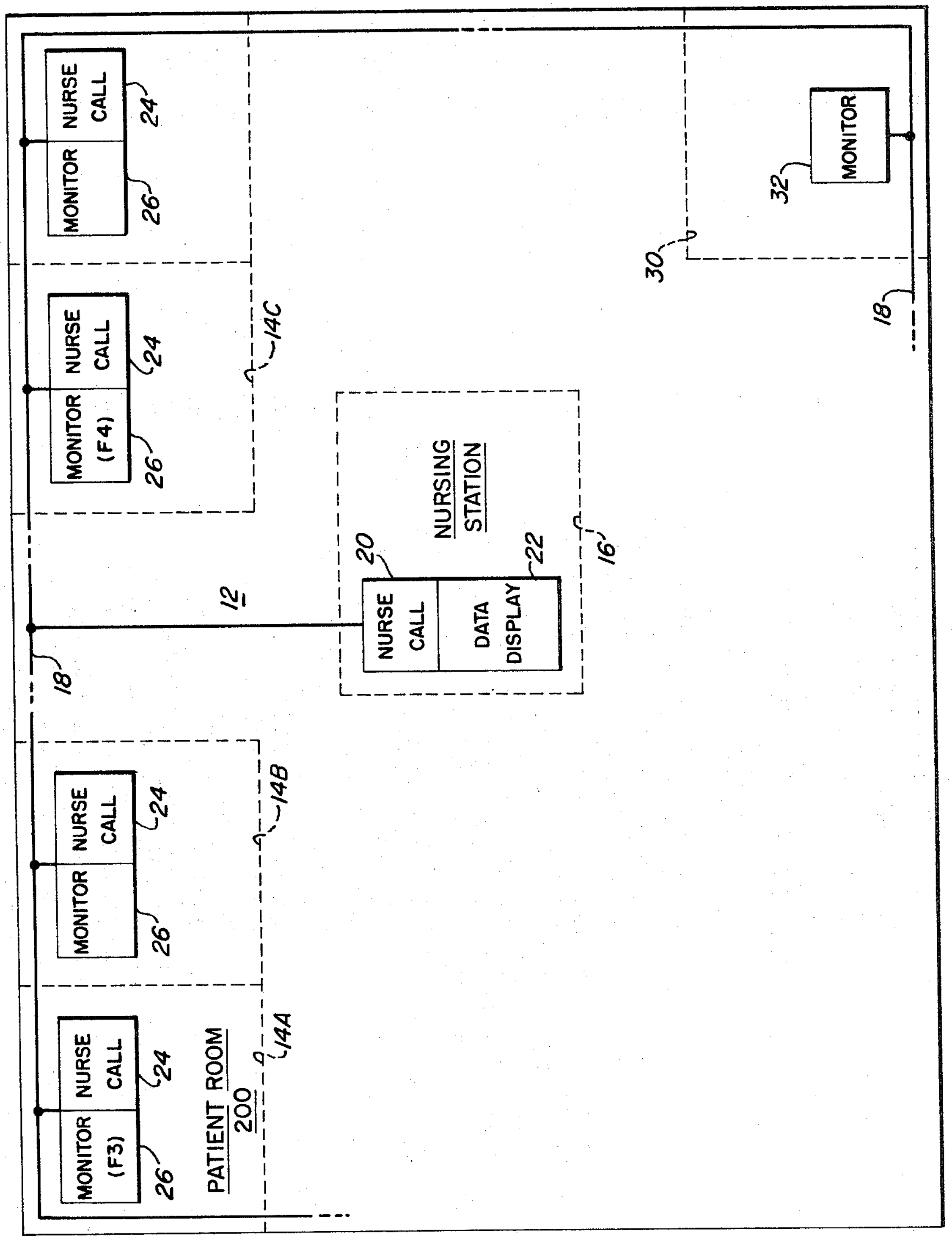
FIG. 1 is a schematic diagram of a portion of a hospital installation illustrating a hospital communication system embodying the present invention.

Referring now more specifically to FIG. 1 of the drawings, therein is illustrated a hospital communication system indicated generally as 10 which embodies the present invention. The system 10 is adapted for use in a hospital, one section of which, such as a floor or wing, is indicated generally as 12. The hospital floor includes a plurality of individual patient rooms 14A, 14B, and 14C and a central or control area such as a nursing station 16. In the communication system 10, the patient rooms 14 and the nursing station 16 are linked by a common communication channel such as a single coaxial cable 18. This cable can be installed during the construction of new hospitals or added to an existing hospital building incident to, for example, renovation or remodeling. The single cable 18 in linking all the patient rooms 14 and the nursing station 16 affords a path for the transmission of the usual nurse-call information as well as physiological data and obviates the need for the multiple wiring runs commonly used.

The nursing station includes a nurse-call unit 20 comprising means for carrying on bidirectional audio communication with each of the patients' rooms as well as selector means for selecting the one or more patient rooms 14 with which communication is desired. The nurse-call unit 20 also includes a display selectively controlled from the patient rooms for indicating request by a patient. The nursing station 16 also includes a physiological data display unit 22 providing a continuous display in temporary or permanent form of physiological data monitored in one or more of the patient rooms.

Each of the patient rooms includes a nurse-call unit 24 for carrying on bidirectional audio communication with the nursing station. The nurse-call unit 24 in the patient rooms also includes a selector operable when a call is to be placed to the nursing station 16 which controls the display means in the nurse-call unit 20 to indicate the identification of the calling room. Some or all of the patient rooms 14 can also be supplied with a monitor unit 26 which includes physiological monitoring devices in combination with circuitry for digitizing the analog values generally provided by the monitors and means for transmitting this data and an identifying address for display in the data display unit 22 at the nursing station 16. The units 20, 22, 24, and 26 are coupled by the common communication link or coaxial cable 18.

Figure 2:
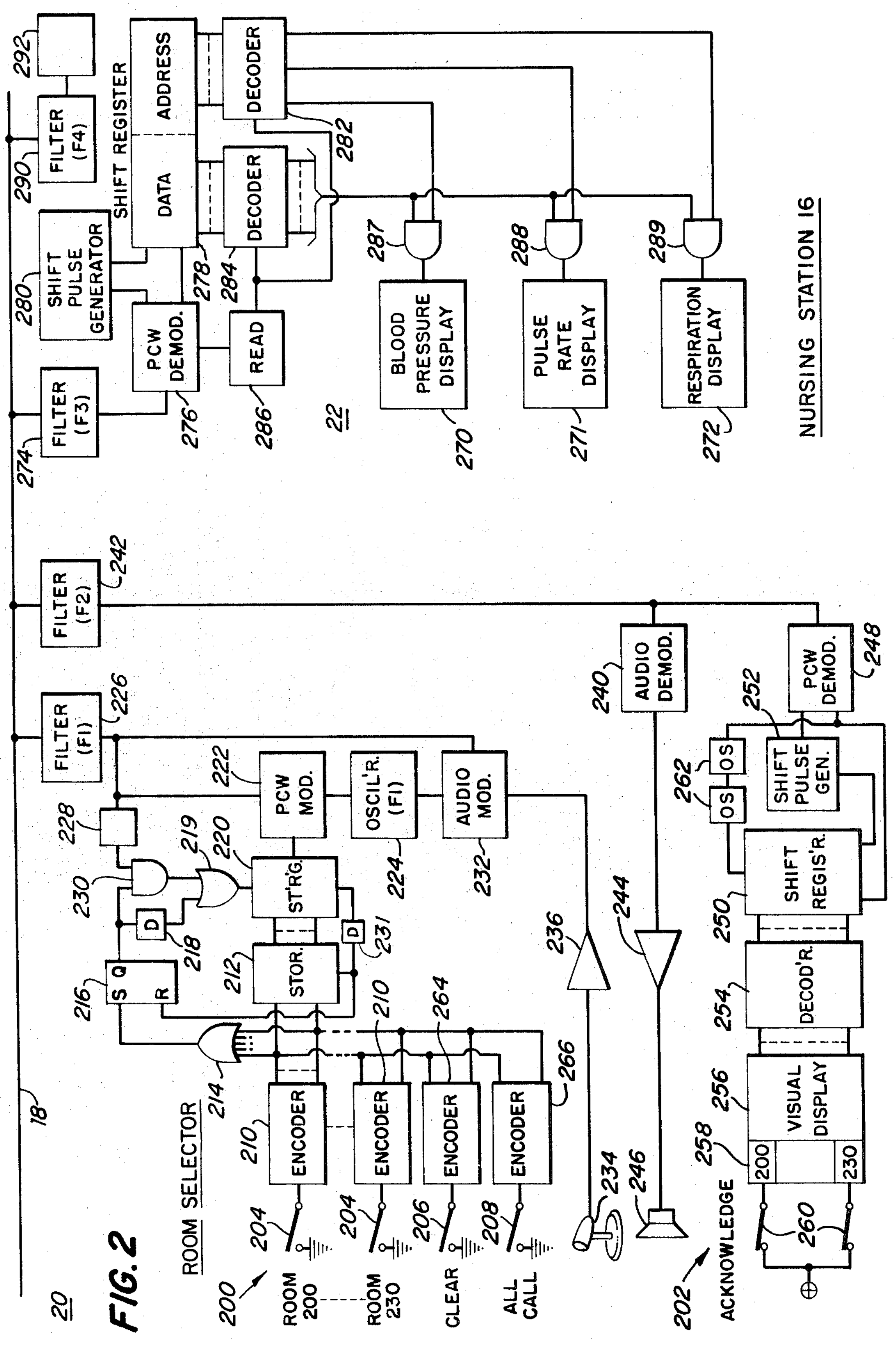
FIG. 2 is a schematic diagram in block logic form illustrating a nursing station forming a part of the hospital communication system.
Figure 3:
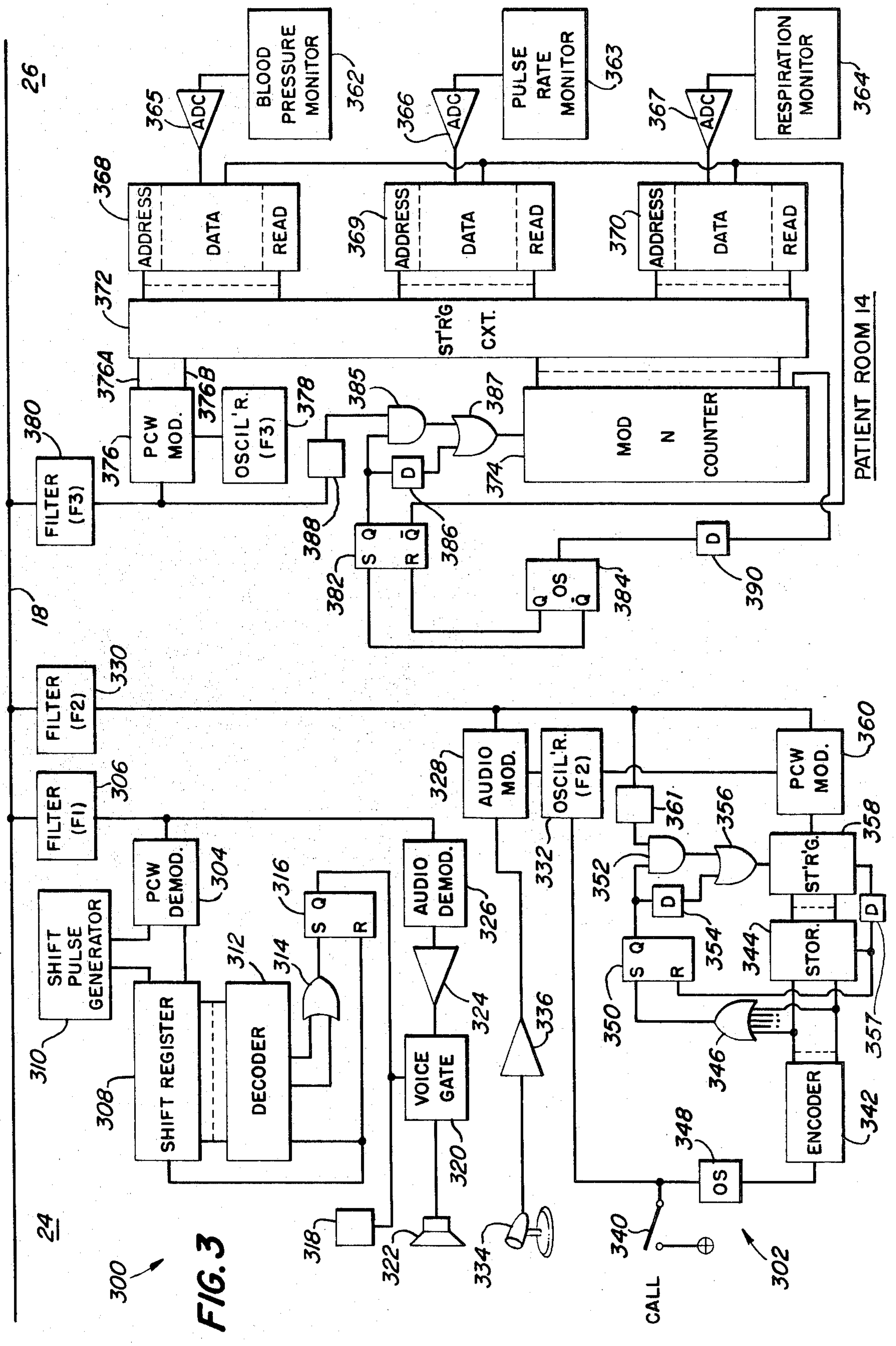
FIG. 3 is a schematic diagram in block logic form illustrating the patient room installation forming a part of the hospital communication system.

The details of the system 10 are illustrated in logic block diagram in FIGS. 2 and 3 of the drawings wherein FIG. 2 illustrates the nursing station 16 and FIG. 3 illustrates a patient room 14. The circuitry illustrated therein is shown in simplified form in AND and OR logic to facilitate an understanding of the invention. The system 10 can be constructed in NAND and NOR logic using, for example, Series 54/74 TTL logic elements manufactured and sold by Texas Instruments, Incorporated of Dallas, Tex. The conversion of the illustrated AND and OR logic elements to TTL logic is well within the expected skill of a designer familiar with digital logic.

In addition, certain information is transmitted between the rooms or stations 14 and 16 over the coaxial cable 18 using pulse code width modulation techniques. The signal train consists of successive signals of two different levels alternated with each other in which consecutive signals have one of two widths or durations representing binary 1 s and 0 s. In certain applications, a further control signal of a third or greatest width or duration is used. U.S. Pat. Nos. 3,289,170, 3,323,112, and 3,405,393 disclose arrangements for transmitting and detecting pulse width modulated 1 and 0 signals as well as the longer duration control signal over a communication channel. The disclosed arrangements also include detecting means for generating a shift or counting signal on each transition between the two received or transmitted signal levels. In the system 10, an arrangement of this type is used, for example, to on-off or level modulate a carrier frequency using known modulator constructions, to detect the modulated carrier to derive the 1, 0, and control information, and to develop shift and counting signals.

NURSE-CALL FACILITIES

The nurse-call units 20, 24 coupled by the single coaxial cable 18 provide means for permitting bidirectional audio communication between the nursing station and the patient room as well as affording a visible and/or audible indication at the nursing station 16 of a calling condition arising at one or a number of the patient rooms 14. The nursing station 16 includes in the unit 20 a room selector circuit indicated generally as 200 selectively operable to call or establish an audio communication channel over the cable 18 to all or one of the patient rooms 14 by selectively transmitting addresses individual to or common to these patient rooms. The unit 20 also includes, in addition to audio transmitting and receiving components, a visual display assembly indicated generally as 202 which provides a visual display of one or more calling patient rooms under the control of addresses selectively transmitted from the patient rooms 14.

The nurse-call facilities in the unit 24 at each patient room 14 include an audio communication receiving unit indicated generally as 300, which on receipt of the address individual to a room 14 conditions voice receiving facilities for operation. Each of the units 24 also includes a call unit indicated generally as 302 which is manually actuated to transmit an address individual to the patient room 14 to the nursing station 16 for display at this station and to render effective an audio link from the patient room 14 to the nursing station 16.

Referring now more specifically to the room selector assembly 200 in the nursing station 16, this assembly includes a number of momentary make, manually operated switches 204 each individual to one of the patient rooms 14. The selector assembly 200 also includes a momentary make, manually operated clear switch 206 which, when actuated, clears the assemblies 300 in the units 24 in all of the patient rooms 14. A similar switch 208 in the selector assembly 200 when operated establishes communication links from the nursing station 16 to all of the patient rooms 14. This permits immediate communication between the nursing station 16 and all of the coupled patient rooms for use, for example, in emergencies.

Assuming that a nurse call is to be extended from the nursing station 16 to the patient room 14A (designated "200" for illustration), the switdh 204 assigned to this room is depressed to control a connected encoder 210 to supply an address of binary 1 s and 0 s to a storage unit 212, preferably consisting of a number of flip-flops corresponding in number to the number of bits in the address individual to the called room 14A. The addressing can be such that, for example, the encoder 210 provides more positive signals representing binary 1 s and a lower or reference level potential representing binary 0 s. Each of the output leads from the encoder 210 is also coupled to the input of an OR gate 214, the output of which is coupled to the set terminal of a flip-flop 216. Whenever a more positive potential appears on one of the output leads from the encoder 210, the OR gate 214 sets the flip-flop 216. The setting of the flip-flop 216 enables the transmission of the address of the called room 14A which is now stored in the storage unit 212.

More specifically, when the flip-flop 216 is set, the positive-going output from the Q output terminal is forwarded through a differentiator 218 and an OR gate 219 to advance a steering circuit or multiplexer 220 to its first setting in which the output of the first storage cell or unit in the storage circuit 212 is coupled to the input of a pulse code width modulator 222. This modulator is also supplied with an assigned carrier frequency (F1) from an oscillator 224. Thus, the modulator 222 now supplies or transmits the first bit of the address of the desired room 14 through an isolating filter 226 to the coaxial cable 18 for transmission to the nurse-call units 24 in all of the patient rooms 14. As set forth above and in the above-identified patents, the modulator 222 changes the amplitude of the carrier frequency supplied by the oscillator 224 on the transmission of each consecutive bit of the address, and the widths or durations of the transmitted signals vary in dependence on the 1 or 0 significance of the bit transmitted.

The output of the modulator 222 is also coupled to the input of a detector 228 which detects transitions in the level of the output of the modulator 222 and delivers a positive-going pulse on each high-to-low or low-to-high transition. This pulse is supplied to one input of an AND gate 230, the other input of which is supplied with an enabling potential by the set flip-flop 216. Accordingly, a pulse is supplied through the AND gate 230 and the OR gate 219 to the input of the steering circuit 220 to advance this counter to its next setting at the termination of the transmission of the first bit by the modulator 222. The modulator 222 now transmits the second bit of the address, and on the termination of this bit the detector 228 advances the steering circuit 220 to its next setting to initiate the transmission of the third bit.

This operation continues until such time as the steering circuit 220 has sequentially rendered each of the storage stages in the storage circuit 212 effective to control the modulator 222. When the last bit of the address has been transmitted, the transition terminating this last bit controls the detector 228 to advance the steering circuit 220 into an overflow condition. This triggers a differentiator 231 to provide a positive-going pulse which is applied to the storage circuit 212 to restore the flip-flops therein to a normal condition. Further, this positive pulse or signal is applied to the reset terminal of the flip-flop 216 to reset this component so that the potential provided at the Q terminal drops to a low level. This applies an inhibit to one input of the gate 230 and prevents further advance of the steering circuit 220 until the flip-flop 216 is again set under the control of the OR gate 214 when the room selector assembly 200 is next operated.

To provide means for transmitting audio signals from the nursing station 16 to the selected patient room 14, the same frequency F1 used for addressing the patient room is utilized. More specifically, the nursing station 16 includes an audio modulator 232 of conventional construction, the output of which is coupled through the filter 226 to the coaxial cable 18 and the carrier frequency input of which is coupled to the output of the oscillator 224. A suitable electroacoustical transducer, such as a microphone 234, is coupled through an amplifier and wave-shaping network 236 to an input of the modulator 232. In this manner, the carrier frequency F1 can be audio modulated by the microphone 234 to provide a means for transmitting audio signals from the nursing station 16 to selected patient rooms 14.

To provide means for transmitting control and audio information from a patient room 14 to the nursing station 16, a separate and distinct frequency assignment or allotment is made. More specifically, the nursing station includes an audio demodulator 240 of known construction. The input of the demodulator 240 is coupled to the coaxial cable 18 through a filter 242. The output of the demodulator 240 is supplied through an amplifying and wave-shaping network 244 to a suitable electroacoustical transducer such as a loudspeaker 246.

Referring now more specifically to the nurse-call unit 24 in the patient rooms 14 (FIG. 3), the unit 24 includes the decoding and audio reproducing assembly 300. This assembly includes a pulse code width demodulator 304, the input of which is coupled to the coaxial cable 18 through a filter 306. The demodulator 304 which can be of the general type referred to above converts the two-level modulated incoming carrier signal of frequency F1 into more positive signals representing, for example, binary 1 s and low level signals representing, for example, binary 0 s. These signals are applied to a serial input terminal of a shift register 308. The shift pulse input of the shift register 308 is coupled to the demodulator 304 through a shift pulse generator 310. The circuit 310 responds to each transition between high and low level signals to develop a series of shift pulses for shifting successive demodulated bits from the decoder 204 into the shift register 308. Therefore, at the end of the transmitted address supplied to the cable 18 by the abovedescribed facilities in the nursing station 16, the address of the desired patient room is stored in the shift register 308 in all the patient rooms 14.

To provide means for selecting only the desired patient room, the output of each of the shift registers 308 is coupled to the input of a conventional decoding network 312. In only the patient room 14 identified by the address transmitted by the nursing station 16, a more positive potential is applied to one input of an OR gate 314 and is effective through this gate to set a flip-flop 316. In all other rooms, flip-flops corresponding to the flip-flop 316 remain in a normal reset condition.

When the flip-flop 316 is set, the potential at the Q output terminal rises to a more positive level to control the energization of a visible indicator 318. The energization of the visible indicator 318 visually indicates to the occupant of the addressed patient room that a call is being extended to this room from the nursing station. The more positive potential at the output of the flip-flop 316 is also applied to a control input of a conventional voice gate 320 which couples an electroacoustical transducer such as a loudspeaker 322 to the output of an amplifying and wave-shaping network 324. The input to the network 324 is supplied with the output from an audio demodulator 326 which receives a modulated input signal from the filter 306. The application of a positive potential to the voice gate 320 renders this gate effective to couple the transducer 322 to the amplified output of the demodulator 326. Thus, the receipt of the proper address by the shift register 308 in the desired patient room renders the demodulating and sound reproducing components in this room effective as well as provides a visible indication of this condition.

The nurse-call unit 24 in each of the patient rooms 14 also includes facilities for transmitting audio intelligence from the patient room to the nursing station 16. These include an audio modulator 328 of conventional construction whose output is coupled to the common communication link or coaxial cable 18 through a filter 330. The modulator 328 is also supplied with a carrier frequency of the frequency F2 from an oscillator 332. The modulating input to the modulator 328 is derived from a suitable electromechanical transducer such as a microphone 334 which is coupled to the input of the modulator 328 through a wave-shaping and amplifying network 336. The oscillator 332 is normally in an ineffective state and is rendered effective by closing a call key 340 in the nurse call assembly 302. With the key 340 closed, the microphone 334 can be used to transmit a message from the patient room 14 to the nursing station 16, either in response to a call from the nursing station 16 indicated by the energized display 318 or when the patient desires to call the nursing station 16.

The operation of the call key 340 is also used to control and actuate the display assembly 202 in the nursing station 16. When responding to a call from the nursing station, the actuation of the key 340 in addition to rendering effective the outgoing audio link provides a visual acknowledgement to the nursing station that the correct patient room has, in fact, been contacted. The closure of the call key 340, when not in response to a call from the nursing station 16, controls the display 202 in the nursing station 16 to indicate that the patient in an identified room desires either attention or to communicate with the nursing station 16. To accomplish this, the call assembly 302 in the nurse-call unit 24 in each of the patient rooms 14 is provided with an address transmitting assembly similar to that provided in the assembly 200 in the nurse-call unit 20 in the nursing station 16.

More specifically, the nurse-call assembly 302 in each patient room 14 includes an encoder 342 whose output is connected to a storage unit 344 and the inputs to an OR gate 346. The input to the encoder 342 is coupled to the call key 340 through a monostable or one-shot circuit 348 which is operative when the key 340 is closed to provide a signal of a given duration set by the timing constants of the circuit 348 to the input of the encoder 342. The encoder 342 stores an address or designation in the storage unit 344 which individually identifies the calling patient room 14, such as the patient room "200" identified as 14A in FIG. 1 of the drawings.

When the designation of the calling patient room 14 is stored in the storage unit 344, a flip-flop 350 is set by the OR gate 346 in the manner described above to partially enable an AND gate 352 and to supply a first operating pulse through a differentiator 354 and an OR gate 356 to advance a steering or multiplexer circuit 358 to its first setting in which the bit value stored in the first flip-flop of the storage unit 344 is rendered effective to control a pulse code width modulator 360. The modulator 360 is coupled to the coaxial cable 18 through the filter 330 and is supplied with the carrier frequency F2 from the oscillator 332. This circuit transmits the designation individual to the calling patient room 14 over the common link 18 to the assembly 202 in the nursing station 16. More specifically, each transition in the output of the demodulator 360 is detected by a detector 361 which delivers a pulse through the gates 352 and 356 to periodically advance the steering circuit 358 so that successive bits of the room designation are supplied to the modulator 360. At the end of the transmission, the steering circuit 358 clears the storage means 344 and resets the flip-flop 350 as described above using a differentiator 357.

In the nursing station 16, the room address or identification in pulse code width modulated form and at the assigned frequency F2 is coupled through the filter 242 to the input of a demodulator 248. The demodulator 248 operates in the same manner as the demodulator 304 in the nurse-call unit 24 and supplies a series of high and low level signals to the input of a shift register 250 in dependence on the binary 1 and 0 content of the received identification. The demodulator 248 also controls a shift pulse generator 252 to provide a shift pulse for transferring the received bits of the identification through the shift register 250 as each level transition is received. The parallel outputs of the shift register 250 are supplied through a decoder 254 to the input of a visual display unit 256 which can comprise different bistable circuits set by the outputs from the decoder 254 representing the different designations of the rooms corresponding to the decoded identifications. These bistable circuits can control suitable lamp drivers to provide, for example, back-lighted panel indications 258 identifying the calling rooms. The opening of an acknowledge key 260, each of which is individual to one of the room displays, terminates the visual display and resets the associated bistable circuit or flip-flop.

To clear the shift register 250, a group of monostable or timing circuits 262 are provided, the first of which is triggered by signals on the output of the demodulator 248. Accordingly, a predetermined time interval following the last received pulse of the identification, the series-connected timing circuits time out and supply a brief resetting pulse to the shift register 250 to clear this register to receive the next transmitted identification. However, the clearing of the shift register 250, although enabling the receipt and decoding of subsequent identifications, does not clear the visual display afforded by the units 256, 258. These are cleared only by manual actuation of the associated acknowledge key 260. In this manner, it is possible for any number of calling room displays to be present at any one time.

When the conversation between the nursing station 16 and the patient room 14 is terminated or whenever the personnel at the nursing station 16 wishes to insure that the nurse-call system is cleared, the clear key 206 is closed to provide a momentary energizing signal to a clear encoder 264. The output of this encoder comprises a clear code common to all of the patient rooms 14. This code is stored in the storage means 212 and is effective through the OR gate 214 to control the flip-flop 216, the steering circuit 220, and the modulator 222 to transmit a clear code to all of the patient rooms over the common communication link 18.

In the patient rooms 14 (FIG. 3), this transmitted clear code is demodulated in the demodulators 304 and stored in the various shift registers 308. When the clear code has been stored in the shift register 308, it is translated by the decoder 312 to provide a more positive signal on the output lead extending to the reset terminal of the flip-flops 316. This signal resets the flip-flops 316 so the enabling potentials are removed from the voice gates 320 and the visual displays 318 are placed in an inactive state. In addition, this positive-going signal from the output of the decoder 312 also resets the shift register 308 to remove the clear code from this register. Thus, the audio link extending from the nursing station 16 to the patient rooms 14 is cleared. The opening of the call key 340 in the patient rooms disables the oscillator 332 in these rooms to prevent transmission using the carrier frequency F2 from the patient rooms 14 to the nursing station 16. The opening of the call key 340 does not affect the one-shot 348, and thus the opening of the call key 340 does not result in retransmission of a patient room identification to the nursing station 16. Thus, the nurse-call system is now restored to a normal state.

The nurse-call unit 20 in the nursing station 16 also includes the all-call key 208. The operation of this key permits the nursing station 16 to be placed in immediate communication with all of the patient rooms 14 coupled to the coaxial cable 18. More specifically, when the all-call key 208 is closed to provide a momentary signal to the input of a connected encoder 266, this encoder provides a pre-assigned all-call code for storage in the storage unit 212. As set forth above, storage of this code in the unit 212 is also effective through the OR gate 214 to control the flip-flop 216, the steering circuit 220, and the demodulator 222 to transmit an all-call code over the coaxial cable 18 to all of the patient rooms.

This code is stored in the shift register 308 (FIG. 3) in all of the patient rooms in the manner described above using the demodulators 304 and the shift pulse generators 310. The storage of the all-call code in the shift registers 308 is translated in the connected decoders 312 to forward a more positive potential through the OR gate 314 to set the flip-flop 316. The setting of the flip-flop 316 enables the voice gates 320 and activates the visual displays 318 so that the nursing station 16 is now in audio communication with all of the patient rooms 14 over the link using the carrier frequency F1. Thus, the personnel at the nursing station 16 can immediately communicate with all of the patient rooms 14 in the event of, for example, an emergency. The nurse-call facilities can be restored to a normal state by momentary depression of the clear key 206 which concurrently resets all of the nurse-call units 24 in the patient rooms 14 in the manner described above.

In this manner, a nurse-call facility is provided in the hospital communication system 10 to permit the nursing station 16 to selectively communicate with any desired patient room or, alternatively, to concurrently establish communication links outwardly from the nursing station 16 to all of the remote patient rooms 14 using the common coaxial cable 18. In addition, these facilities permit patient control of the selective establishment of a communication link from any given one or all of the patient rooms 14 to the nursing station 16. Concurrently therewith, facilities in the nurse-call units 24 in the patient rooms 14 can provide individual or concurrent visual displays of calls from the patient rooms. These facilities are capable of virtually unlimited expansion to accommodate additional rooms or locations to which audio communication is desired merely by providing additional addressing facilities in the nursing station and the receiving and decoding facilities at the desired locations without requiring the installation of further wiring.

PHYSIOLOGICAL DATA MONITORING

The units 22 and 26 in the nursing station 16 and patient rooms 14, respectively, provide for unidirectional transmission of physiological data from the patient rooms 14 to a central display point, such as one at the nursing station 16. In general, the physiological data monitoring facilities utilize a technique in which each data item to be monitored and displayed is provided with an individual address on transmission which is decoded on reception to direct the physiological data to the proper display unit. By using this technique, it is possible to simultaneously display a given item of data at a number of different locations on the correct display unit without requiring individual wiring for each data monitor or without requiring transmission of all monitored data to each desired location.

More specifically, the physiological data unit 26 in the patient room 14 includes a number of known physiological data monitoring devices 362–364 (FIG. 3) of known construction for monitoring any desired condition, such as, for example, blood pressure, pulse rate, and respiration. These monitors are known, and representative ones are disclosed, for example, in NASA Tech Briefs Nos. 68-10065, 68-10131, 68-10365, and 70-10528, which are available from the Clearing House For Federal Scientific and Technical Information in Springfield, Va. The outputs of these monitors are commonly in analog form, and accordingly, the outputs of the monitors 362-364 are supplied to the inputs of three individual analog-to-digital converters 365–367, respectively, to place the analog values in digital form.

To prepare this digitized information for transmission, three storage units 368–370 are provided, whose inputs are individually coupled to the outputs of the converters 365–367. These storage units are effectively divided into three sections for storing address information, data derived from the analog-to-digital converters, and a read section. The section for storing data preferably comprises a group of bistable circuits or flip-flops corresponding in number to the number of bits of digitized physiological data to be transmitted. The inputs to the flip-flops are coupled to the outputs of the converters 365–367 through parallel input gates so that the settings of these flip-flops are continuously changed in accordance with monitored data during the interval in which an enabling potential is supplied to the input gates. The address section of each of the storage units 368–370 permanently stores a multi-bit address individually identifying the related monitor. This can be provided, for example, by a conventional patchboard. The read section of each of the storage units 368–370 comprises a special single bit signal provided, for example, by strapping logic ground or logic potential to cause the transmission of a signal that is translated on receipt to cause the display of the transmitted physiological data.

The outputs of the storage units 368–370 are supplied to the input of a steering circuit or multiplexer 372 which comprises, for example, a conventional array of individual gates sequentially enabled by the decoded output of a mod N counter 374 to transfer individual bits of data from the storage units 368–370 to the input of a pulse code modulator 376. The modulator 376 is similar to the modulators 222 and 360 but further includes the provision of a long pulse or signal control of the type described in the patents previously referred to for transmitting a long control pulse greater in duration than either of the signals representing binary 1 s and 0 s at either a high or low level output. The steering circuit 372 couples the address and data storage units in the components 368–370 in sequence to an input lead 376A to the modulator 376 to control the transmission of signals representing binary 1 s and 0 s. The steering circuit 372 couples the three output leads from the read sections of the storage units 368-370 to an input lead 376B to the modulator 376 which controls this modulator to transmit the long control signal.

To provide a distinct channel on the coaxial cable 18 for transmitting physiological data from the patient room 14A, for example, to the nursing station 16, the carrier frequency input to the modulator 376 is coupled to the output of an oscillator 378 to provide a carrier signal of frequency F3. The output of the modulator 376 is coupled to the coaxial cable 18 through a filter 380.

Assuming that a flip-flop 382 is in a reset condition, the $\overline{Q}$ terminal of this flip-flop provides a more positive potential which is applied to the enabling input of the parallel input gates to the data sections of the storage units 368–370. This permits the continuous updating of the physiological data provided by the monitors 362–364 at the output of the analog-to-digital converters 365–367. When a monostable circuit 384 times out, its $\overline{Q}$ terminal rises to a more positive potential and sets the flip-flop 382.

When the flip-flop 382 is set, its $\overline{Q}$ terminal drops to a low level potential to inhibit the inputs to the storage units 368–370 and prevent any change in the data stored therein during the transmission cycle. The setting of the flip-flop 382 also elevates the potential at its Q terminal to enable one input to an AND gate 385. This positive-going signal at the Q terminal of the set flip-flop 382 is also forwarded through a differentiator 386 and an OR gate 387 to the count input of the mod N counter 374. This is effective to advance the counter 374 to its first setting so that the first steering gate in the circuit 372 is rendered effective to couple the first bit of the address in the storage unit 368 to the input of the modulator 376 over the line 376A.

The modulator now transmits the first bit of the address individual to the blood pressure monitor 362 over the coaxial cable 18 to the receiving or display unit, such as the unit 22 at the nursing station 16. The transition in state at the end of this first bit is detected by a detector 388 to forward a pulse through the enabled AND gate 385 and the OR gate 387 to the counting input of the counter 374. This pulse advances the counter 374 to its next setting, and its decoded output enables the second gate in the steering circuit 372 so that the second bit of the address from the unit 368 is transferred to the input of the modulator 376. In this manner, the remainder of the address and the blood pressure data stored in the data section of the unit 368 are transmitted over the link 18.

On the transition detected by the detector 388 following the transmission of the last bit of blood pressure data, the counter 374 is advanced to its next setting in which the read bit stored in the unit 368 is transferred over the line 376B to the modulator 376. The modulator now transmits the long control signal to the cable 18 indicating that a complete message consisting of address and data for one monitored item has been transmitted.

At the termination of the long signal, the transition again is detected by the detector 388, and the counter 374 is advanced. In this manner, the address, data, and read signals stored in the units 369 and 370 are transmitted to the coaxial cable 18. The transition at the end of the read signal from the storage unit 370 advances the counter 374 to its next setting so that a differentiator 390 supplies a positive-going pulse to the input of the timing circuit 384.

This circuit is now set so that its Q terminal rises to a more positive potential, and its $\overline{Q}$ terminal drops to a lower potential. This resets the flip-flop 382 so that the gate 385 is inhibited to prevent further advance of the counter 374. When the flip-flop 382 is reset, its $\overline{Q}$ terminal rises to a more positive potential to remove the inhibit previously applied to the parallel input gates to the data sections of the storage units 368-370. This permits these settings to be updated in accordance with the outputs of the monitors 362-364. When the timing circuit 384 times out, the flip-flop 382 is set, and the data derived from the monitors 362-364 is again transmitted over the coaxial cable 18 in the manner described above. By adjusting the timing period of the circuit 384, the rate of transmission of the monitored data as well as the period allowed for updating data in the storage units 368–370 can be adjusted.

The nursing station 16 (FIG. 2) includes the unit 22 for receiving and displaying data transmitted from patient rooms 14. The display means illustrated comprise three display units 270, 271, and 272 for displaying blood pressure, pulse rate, and respiration data transmitted from a patient room, such as room "200". The display units 270–272 are of conventional construction and can comprise, for example, bistable storage elements such as flip-flops for storing bits of digitized physiological data. These flip-flops control suitable visual displays such as seven-element LED's. Such assemblies are commercially available and include, in addition to the storage and display elements, suitable block pulse sources for sequencing and synchronizing displays in accordance with the data stored in the flip-flops. The display assemblies 270–272 could also comprise recording elements or units for converting from digital to analog form the received data and displaying it in permanent or temporary form.

The unit 22 includes a filter 274 coupling a pulse code width demodulator 276 to the common coaxial cable 18. The demodulator 276 is similar to the demodulators 248 and 304. Thus, the demodulator 276 supplies a series of high and low level signals to the serial input terminal of a shift register 278, preferably having a capacity sufficient to store all of the address and data bits from one of the storage units 368–370. The demodulator 276 controls a shift pulse generator 280 to provide a shift pulse on each transition between levels on the incoming signals so that the received address and data bits are sequentially shifted into and through successive stages of the shift register 278. Thus, at the end of transmission of the address and data information stored, for example, in the unit 368 (FIG. 3), the address data is stored in the indicated portion of the shift register 278 (FIG. 2), and the physiological data is stored in the indicated portion. The outputs of the address stages of the shift register 278 are coupled to the inputs of an address decoder 282, and the outputs of the data stages in the shift register 278 are coupled to the inputs of a data decoder 284. A read circuit 286 normally applies an inhibiting potential to input gates for the decoders 282 and 284.

However, when the long signal following the transmission of the address and physiological data from, for example, the storage unit 368 is received, the demodulator 276 detects or demodulates this long signal and applies a momentary control signal to the circuit 286 so that an enabling potential is applied to the decoders 282 and 284. This gates the data from the shift register 278 into these decoders for translation. The decoder 282 translates the address data by supplying an enabling potential to one input of each of three sets of gates shown schematically as single gates 287–289. Assuming that the transmitted data relates to blood pressure, a set of gates 287 is enabled, and the decoded blood pressure information is supplied from the decoder 284 to the display unit 270 for storage therein. At the end of the pulse from the read circuit 286, the decoders 282 and 284 are again inhibited, and the previously decoded information is shifted out of the end of the shift register 278 as the next address and data message from, for example, the storage unit 369 is shifted into the shift register 278.

This operation continues in the manner described above so that the gates 288 and 289 are sequentially enabled under the control of the decoder 282 and the read pulse source 286 to transfer the pulse rate and respiration data into the corresponding displays 271 and 272. During the period in which data is not transmitted from the patient room 14, the data previously stored in the displays 270–272 remains on display and is changed or updated during successive cycles of transmission from the patient room 14 under the control of the counter 374 and the steering circuit 372.

Accordingly, by the use of individual identifying addresses appended to each of the transmitted physiological data items, it is possible to produce selective displays of this data at any point within the hospital linked by the common coaxial cable 18. As an example, an additional control area 30 can be provided in the hospital including a further monitor unit 32 with data receiving and decoding facilities similar to the facilities provided in the unit 22 at the nursing station 16. If, for example, it is desired to monitor only blood pressure in the control area 30, the decoder 282 provided in the unit 32 provides an output corresponding to the address appended to the blood pressure data to control the display of this information in the monitor unit 32, concurrently with this display at the nursing station 16.

Further, although facilities for transmitting data from, for example, only one patient room 14A are illustrated in the drawings, similar units 22 and 26 are provided for additional patient rooms in which physiological data is to be monitored. Each of these additional units is assigned an individual frequency such as the frequency F3 assigned to the patient room 14A. As an example, the monitoring unit 26 in the patient room identified as 14C is the same as the unit 26 illustrated in FIG. 3 except that a different signaling frequency F4 is assigned to the unit 26 in room 14C to frequency separate the physiological data originating in this room. Accordingly, the monitoring unit 22 in the nursing station 16 includes a filter 290 for coupling the coaxial cable 18 to a display and decoding assembly 292. The assembly 292 can be identical to the circuitry coupled to the cable 18 by the filter 274.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. A hospital communication system for use with a central area and spaced patient rooms each having an individual designation comprising a common communication link, nurse-call communication units in the central area and the patient rooms each coupled to the common link to provide selective audio communication between the central area and the patient rooms, the nurse-call unit in the central area including selector means for transmitting plural bit signals representing the different patient room designations, the nurse-call unit in the patient rooms each including a decoder for translating a received plural bit signal representing the designation of a given room into a control signal, the nurse-call unit in each of the patient rooms also including an audio communication means supplied with and rendered effective by said control signal, physiological data monitoring means in at least one of the patient rooms and coupled to the common link, said monitoring means including a number of means each providing a message including data in digital form relating to a different physiological factor and accompanied by an individual plural bit identifying designation, and physiological data display means in the central area and coupled to the common link, said display means including a number of display units, a plural stage storage means coupled to the common link for storing successive single messages received from the monitoring means over the common link, each message including physiological data in digital form and a plural bit designation, and decoding means coupled between the stages of the storage means containing the plural bit designations and the number of display units for directing the physiological data from successive messages from the stages of the storage means containing physiological data to different ones of the display units in dependence on the successive stored designations.

2. A hospital communication system for use with a central area and remote patient rooms having individual designations comprising a single communication link extending between the central area and the patient rooms, a central nurse-call unit in the central area coupled to the link, said central unit including audio transmitting and receiving means, said central unit also including selector means for transmitting different plural bit room designation codes, and room nurse-call units in the patient rooms coupled to the link, each room unit including audio transmitting and receiving means, said room units ach including a plural bit code storage means for storing received plural bit codes, a decoding means coupled to the storage means for decoding only the room designating code individual to a given room, and a storage element operated by the decoding means and coupled to the audio receiving means to render the audio receiving means effective only when the storage element is operated.

3. The system set forth in claim 2 in which the central nurse-call unit includes clear means operable to transmit a distinct plural bit clear code over the link for storing in the code storage means in all of the room nurse-call units, and the decoding means in each of the room nurse-call units decodes a clear code stored in the coupled storage means to clear the storage element and render the connected audio receiving means ineffective.

4. The system set forth in claim 2 in which the central nurse-call unit includes all-call means operable to transmit a distinct plural bit all-call code over the link for storage in the code storage means in all of the room nurse-call units, and the decoding means in all of the room nurse-call units decodes the all-call code to operate the storage element and render the audio receiving means effective.

* * * * *